US011012312B2

(12) United States Patent
Jana et al.

(10) Patent No.: US 11,012,312 B2
(45) Date of Patent: May 18, 2021

(54) NETWORK SLICE MANAGEMENT

(71) Applicant: AT&T Intellectual Property I, L.P., Atlanta, GA (US)

(72) Inventors: Shraboni Jana, Danville, CA (US); Mostafa Tofighbakhsh, Cupertino, CA (US); Dhruv Gupta, San Ramon, CA (US); Deva-Datta Sharma, San Ramon, CA (US); Rittwik Jana, Montville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 22 days.

(21) Appl. No.: 16/521,401

(22) Filed: Jul. 24, 2019

(65) Prior Publication Data
US 2021/0028988 A1 Jan. 28, 2021

(51) Int. Cl.
*H04L 12/28* (2006.01)
*H04L 12/24* (2006.01)
*H04W 72/04* (2009.01)

(52) U.S. Cl.
CPC ...... *H04L 41/0893* (2013.01); *H04L 41/5003* (2013.01); *H04W 72/04* (2013.01)

(58) Field of Classification Search
CPC . H04L 41/0893; H04L 41/12; H04L 41/5003; H04L 41/5006; H04L 41/5051; H04L 41/5077; H04L 47/70; H04L 63/08; H04L 63/20
See application file for complete search history.

(56) References Cited

U.S. PATENT DOCUMENTS

| 2013/0235807 | A1* | 9/2013 | Lee | H04W 72/12 370/329 |
| 2016/0099763 | A1* | 4/2016 | Chen | H04W 56/0045 370/329 |
| 2018/0376414 | A1* | 12/2018 | Zeng | H04W 8/02 |
| 2020/0044943 | A1* | 2/2020 | Bor-Yaliniz | H04L 41/18 |

OTHER PUBLICATIONS

Xiang, et al., "Network Slicing in Fog Radio Access Networks: Issues and Challenges." IEEE Communications Magazine, Dec. 2017, 55(12): pp. 110-116. [http://cybersci-hub.se/MTAuMTEwOS9tY29tLjlwMTcuMTcwMDUyMw==/10.1109%40MCOM.2017.1700523.pdf]. Last accessed May 19, 2019.
Elliott, et al. "Dynamic End-to-end network slicing unlocks 5G possibilities." Nokia, Jul. 28, 2016. 10 pages. [https://www.nokia.com/blog/dynamic-end-end-network-slicing-unlocks-5g-possibilities/]. Last accessed May 19, 2019.
"5G; NR; Overall description; Stage-2" 3GPP TS 38.300 V15.3.1. Oct. 2018. 90 pages. [https://www.etsi.org/deliver/etsi_ts/138300_138399/138300/15.03.01_60/ts_138300v150301p.pdf]. Last accessed May 19, 2019.

* cited by examiner

*Primary Examiner* — Minh Trang T Nguyen
(74) *Attorney, Agent, or Firm* — Amin, Turocy & Watson, LLP

(57) ABSTRACT

The described technology is generally directed towards network slice management. A mobile communications network can comprise multiple sub-networks, namely, as an access network, a transport network, and a core network. Access network resources can be managed according to the techniques provided herein to meet service level agreement (SLA) commitments associated with network slices. Furthermore, resources of any sub-network can be managed in a manner that accounts for constraints imposed by the other sub-networks.

20 Claims, 9 Drawing Sheets

Multi-Dimensional Operation

| S-NSSAI | Probability of Meeting SLA | | | | | |
|---|---|---|---|---|---|---|
| | DualConn-gNB#-LTE#-Policy# | DualConn-gNB(Sub6)#-gNB(mmwave)#-Policy# | CA Carrier1#-Carrier2#-Policy# | CBRS | Wifi-2.4GHz | ... |
| S-NSSAI-1 | 10% | 90% | 45% | 88% | 7% | ... |
| S-NSSAI-2 | 19% | 9% | 95% | 66% | 8% | ... |
| ... | ... | ... | ... | ... | ... | ... |

NETWORK SLICE MANAGEMENT

TECHNICAL FIELD

The subject application is related to wireless communication systems, and, for example, to management of network slices in a wireless communication network.

BACKGROUND

The rise of massive scale connected devices via the internet leads to diversified wireless communication service requirements, with different user equipment (UE) devices and applications having different communication needs. For example, internet-of-things (IoT) devices, mobile phones, surveillance cameras, autonomous guided vehicles and low-latency applications such as augmented reality (AR) and virtual reality (VR) devices all have unique communication service requirements. Therefore, wireless communication service providers, such as AT&T Corporation and others, will increasingly need to deploy their communication services flexibly to accommodate such diversified service requirements.

The emerging Third Generation Partnership Project (3GPP) New Radio (NR) fifth generation (5G) mobile communication standard includes support for network slicing. Network slicing provides at least a partial solution to support diversified wireless communication service requirements. However, network slicing technologies are still not fully developed. For example, wireless communication networks are typically divided into different sub-networks, including an access sub-network, a transport sub-network, and a core sub-network. While current network slicing solutions address slicing of core sub-network resources, further development is needed to address network slicing of access and transport sub-network resources, and furthermore, to provide integrated end-to-end network slice management.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
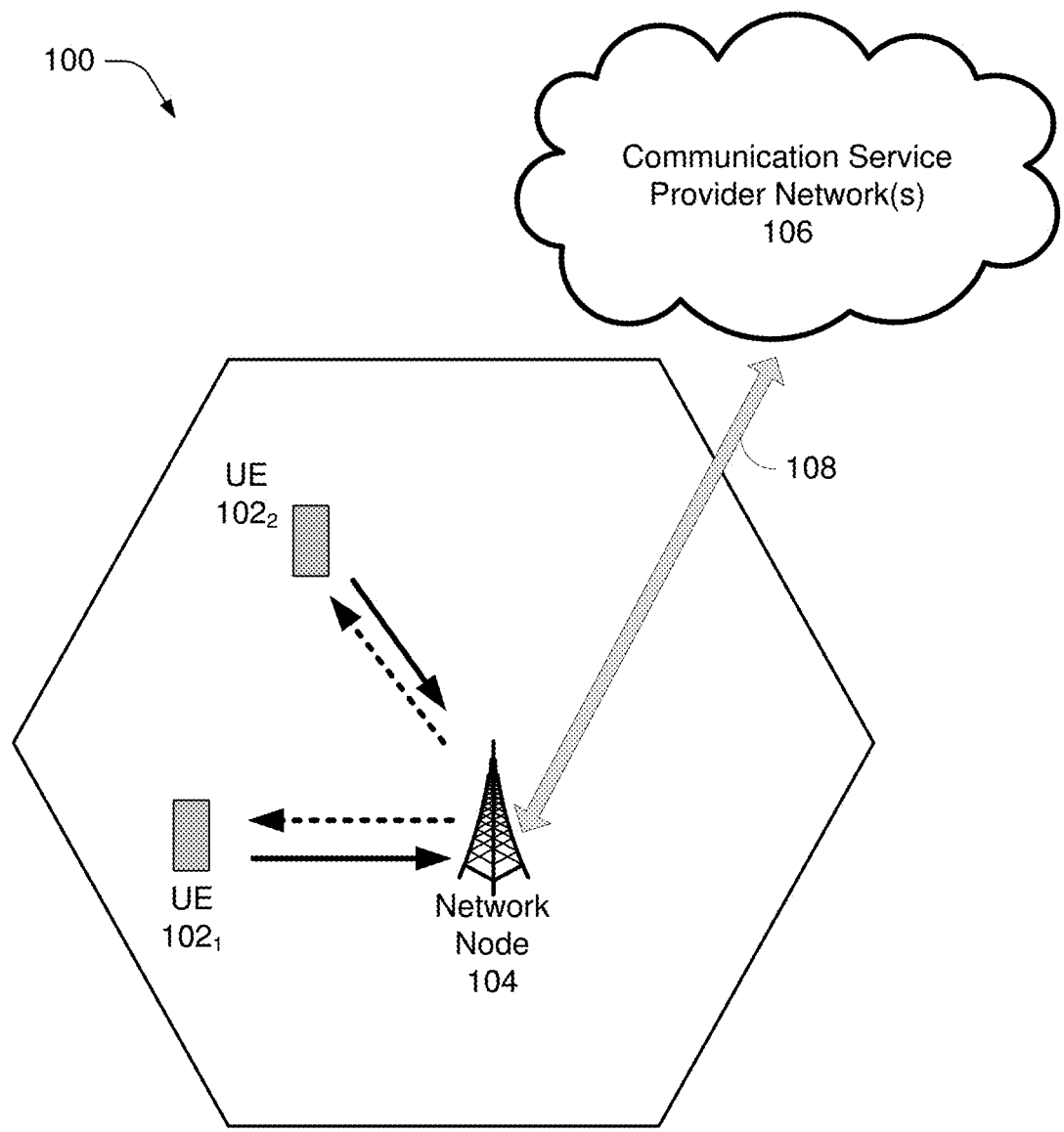
FIG. 1 illustrates a non-limiting example of a wireless communication system in accordance with various aspects and embodiments of the subject disclosure.

One or more aspects of the technology described herein are generally directed towards network slice management. A mobile communications network can comprise multiple sub-networks, namely, as an access network, a transport network, and a core network. Access network resources can be managed according to the techniques provided herein to meet service level agreement (SLA) commitments associated with network slices. Furthermore, resources of any sub-network can be managed in a manner that accounts for constraints imposed by the other sub-networks. Further aspects and embodiments of the disclosed technology are described in detail below.

It should be understood that any of the examples and terms used herein are non-limiting. For instance, the examples are based on 5G communications between a user equipment exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology. The technologies included in the 5G wireless communication standards, including, e.g., the fifth generation core (5G Core), and the fifth generation option 3× (5G Option 3×) standards, are particularly suited for some embodiments. However, future wireless communications technologies, beyond 5G, can also include the technologies described herein as will be appreciated. Other wireless communication technologies can also be adapted to employ the techniques disclosed herein. Such other wireless communication technologies comprise, but are not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise a "base station" and one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G core includes elements referred to as network functions, some of which can optionally be implemented software. The network functions include, for example: the Authentication Server Function (AUSF); the Core Access and Mobility Management Function (AMF); the Data network (DN); the Structured Data Storage network function (SDSF); the Unstructured Data Storage network function (UDSF); the Network Exposure Function (NEF); NF Repository Function (NRF); the Policy Control function (PCF); the Session Management Function (SMF); the Unified Data Management (UDM); the User plane Function (UPF); the Application Function (AF); the User Equipment (UE); and the Radio Access Network (RAN).

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

In general, the wireless communication system 100 can comprise three subnetworks: an access sub-network which generally comprises the physical resources at the network node 104, a transport sub-network which generally comprises the physical resources at the one or more backhaul links 108, and a core sub-network which generally comprises the physical resources at the communication service provider network(s) 106.

Figure 2:
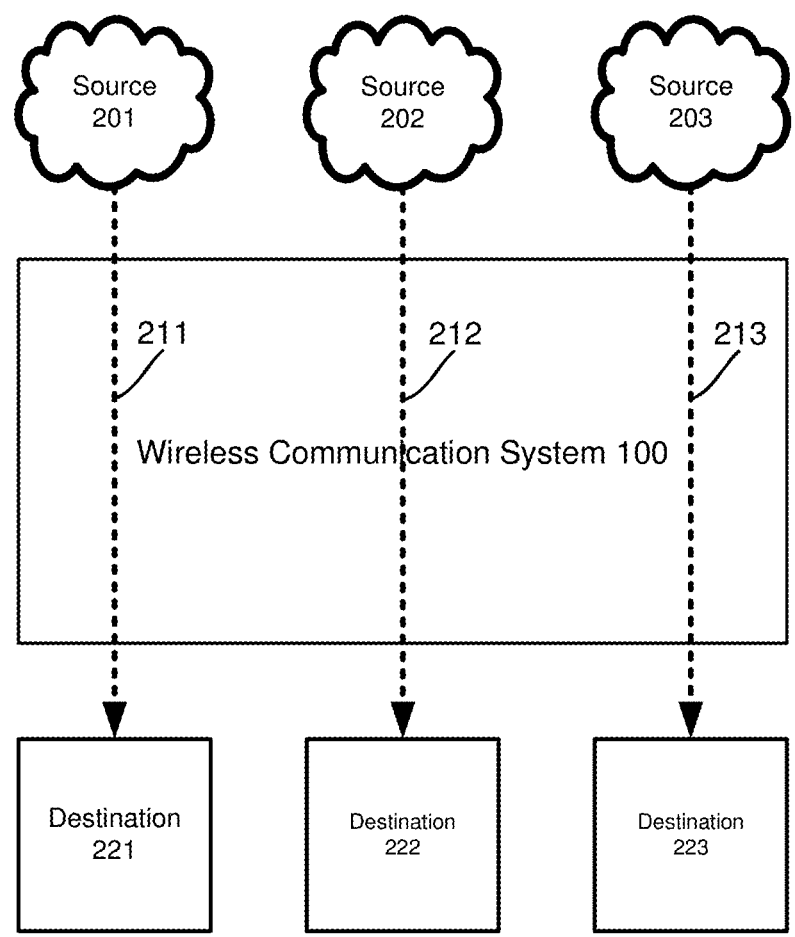
FIG. 2 is a diagram illustrating example network slices in wireless communication system such as illustrated in FIG. 1, in accordance with various aspects and implementations of the subject disclosure.

FIG. 2 is a diagram illustrating example network slices in a wireless communication system such as illustrated in FIG. 1, in accordance with various aspects and implementations of the subject disclosure. Repetitive description of like elements employed in other embodiments described herein is omitted for sake of brevity. FIG. 2 includes wireless communication system 100, introduced in FIG. 1, as well as example sources 201, 202, 203, example network slices 211, 212, 213, and example destinations 221, 222, 223.

In an aspect, wireless communication system 100 can support different network slices 211, 212, 213 for different customer uses cases, e.g., mobile telephones, smart home communications, IoT communications, connected cars, smart energy grid applications, etc. Each use case receives a network slice 211, 212, or 213, which has a set of resources and a network topology and can provide certain SLA specified properties, such as connectivity properties, speed properties, and capacity properties, to meet the needs of the use case.

In another aspect, network slicing provides a virtual networking architecture which allows for better network flexibility through partitioning of wireless communication system 100 into virtual elements. Network slicing can allow creation of multiple virtual networks, each virtual network supporting a network slice 211, 212, 213 within the shared physical infrastructure of wireless communication system 100. Logical partitions created through network slicing allow capacity of wireless communication system 100 to be dynamically directed according to real-time needs. As needs change, so can the resources supplied to different network slices 211, 212, 213. Using common physical resources, such as storage and processors, network slicing permits the creation of network slices 211, 212, 213 which can be applied to logical, self-contained, and partitioned network functions.

Network slices 211, 212, 213 can support providing wireless communication system 100 on an "as-a-service" basis to meet the range of use cases present in communications from sources 201, 202, 203 to destinations 221, 222, 223. Network slice 211 can for example provide connectivity to IoT devices with a high availability and high reliability data-only service, with a given latency, data rate and security level. Network slice 212 can for example provide very high throughput, high data speeds and low latency for an augmented reality service. Network slice 213 can for example provide mobile voice telephony communications. Further network slicing use cases can include expanded mobile broadband with more video, higher speeds and wide scale availability; massive machine-type communications with transportation monitoring and control; mass market personalized TV with big data analytics; and critical machine-type communications with remote operation. Each of these use cases and others can use different configurations of requirements and parameters, and can therefore be provided with a tailored network slice.

Network slices 211, 212, 213 can be optimized for myriad characteristics including latency and bandwidth requirements. In some embodiments, network slices 211, 212, 213 can be isolated from each other in control and user planes, allowing user, device and application experiences of the different network slices 211, 212, 213 to simulate physically separate networks.

Figure 3:
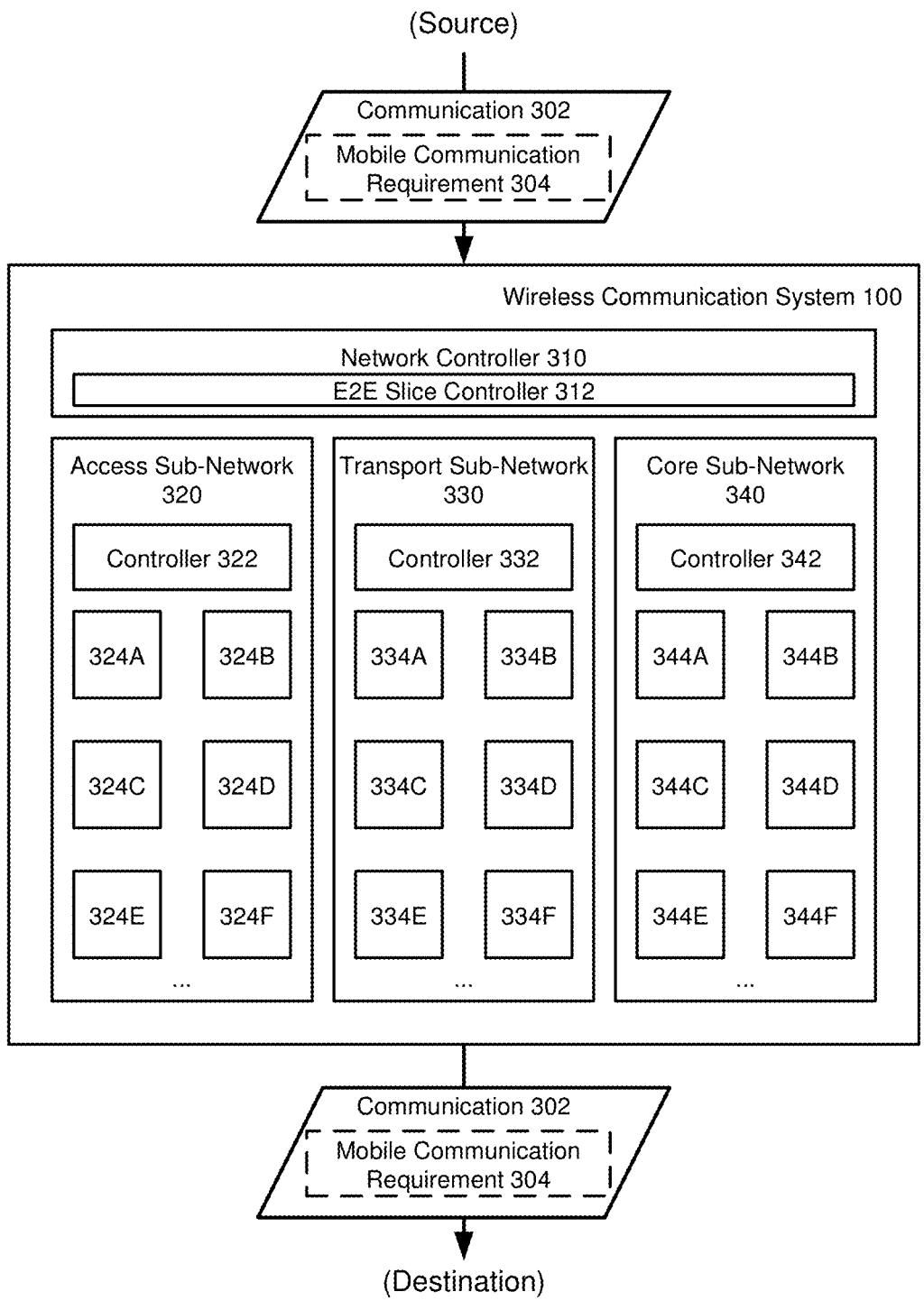
FIG. 3 is a block diagram illustrating sub-networks equipped with various resources, wherein the sub-networks can be managed in connection with network slice management, in accordance with various aspects and embodiments of the subject disclosure.

FIG. 3 is a block diagram illustrating sub-networks equipped with various resources, wherein the sub-networks can be managed in connection with network slice management, in accordance with various aspects and embodiments of the subject disclosure. Repetitive description of like elements employed in other embodiments described herein is omitted for sake of brevity. FIG. 3 includes a communication 302 from a source, such as a UE or any of sources 201, 202, 203 illustrated in FIG. 2. The communication 302 has, or is associated with, a mobile communication requirement 304. The communication 302 is received at wireless communication system 100 from the source, and the communication 302 is transmitted by wireless communication system 100 to a destination, such as another UE, or any of destinations 221, 222, 223 illustrated in FIG. 2.

Wireless communication system 100 comprises a network controller 310, an access sub-network 320, a transport sub-network 330, and a core sub-network 340. Network controller 310 comprises an end to end (E2E) slice controller 312. Access sub-network 320 comprises a controller 322 and example resources 324A, 324B, 324C, 324D, 324E, 324F. Transport sub-network 330 comprises a controller 332 and example resources 334A, 334B, 334C, 334D, 334E, 334F. Core sub-network 340 comprises a controller 342 and example resources 344A, 344B, 344C, 344D, 344E, 344F.

Network slicing generally employs virtual networks created on top of a physical network by partitioning the physical network, where each partition (network slice) can be architected and optimized, e.g., for a user, application, or service. The network slice can be a self-contained network with its own virtual resources, topology, traffic flow and provisioning rules. Conception, design and implementation of E2E network slicing in 5G can expand over UEs, access sub-network 320, transport sub-network 330, and core sub-network 340.

Network slices can have associated SLA commitments. For example, an example SLA commitment associated with a network slice can specify a total time for wireless communication system 100 to deliver communication 302 from the source to the destination. Another example SLA commitment associated with a network slice can specify reliability for delivering communication 302 from the source to the destination. Mobile communication requirement 304 can reflect an SLA commitment or other mobile communication requirement associated with a network slice. Communication 302 can, but need not necessarily specify mobile communication requirement 304. In some embodiments, wireless communication system 100 can ascertain a network slice for communication 302, and wireless communication system 100 can infer mobile communication requirement 304 from the network slice assigned to communication 302.

Various aspects of this disclosure relate to assigning, e.g., by E2E slice controller 312, controller 322, controller 332, and/or controller 342, resources from the access sub-network 320, transport sub-network 330, and core sub-network 340, respectively, to network slices in order to meet requirements (such as mobile communication requirement 304) associated with the network slices. In an embodiment, the E2E slice controller 312, controller 322, controller 332, and controller 342 can comprise 5G slice aware controllers having any of the various tools and features presently included in 5G specifications and tools and features as may be later developed and incorporated into the 5G specifications. The illustrated resources from the access sub-network 320, transport sub-network 330, and core sub-network 340 represent physical network resources and/or virtual network resources, as will be appreciated.

Furthermore, embodiments of this disclosure can provide a mechanism to deliver SLA commitments by dynamically creating access sub network 320 slices, e.g., within the umbrella of open radio access network (O-RAN) in 5G networks and beyond. Some embodiments can use closed-loop auto-slicing through time-series inferences and statistical models, to successfully manage access sub-network 320 slices.

In some implementations, network slicing can be implemented in an E2E manner which can includes slicing the access sub-network 320, the transport sub-network 330, and the core sub-network 340. Aspects of this disclosure focus on the access sub-network 320 in particular. There are a multitude of wireless access environments available, and moreover, access nodes can have numerous tunable parameters. Furthermore, there are numerous use cases requiring low latency, increased bandwidth, and priority SLA (e.g., FirstNet, Connect car, Industry 2.0, etc.) that can benefit from network slicing at the access sub-network 320.

The next generation (NG) RAN supports resource isolation between network slices. NG-RAN resource isolation can be achieved by means of radio resource management (RRM) policies and protection mechanisms that avoid shortages of shared resources in network slices, as such shortages can break the SLAs in other network slices. Solutions can optionally fully dedicate NG-RAN resources to a certain network slice. How NG-RAN supports resource isolation is implementation dependent. This presents a problem for wireless communication service providers, namely: how to provision and manage access sub-network 320 slices based on E2E network slicing. That is, how to allocate the right resources of example access sub-network 320 resources 324A, 324B, 324C, 324D, 324E, 324F, at the right time and in the right place, based on performance requirements in the access sub-network 320. In another sense, the problem is one of selecting the right anchor points in multiple radio access technology (multi-RAT) access sub-networks.

Since network slicing is E2E, embodiments can enable the access sub-network 320 to meet network slice requirements in scenarios when another sub-network (transport sub-network 330 or core sub-network 340) is not able to meet network slice targets. For example, suppose, an ultra-reliable low latency communication (URLLC) application requires an end-to-end latency of 18 milliseconds (ms) or less between users. Core sub-network slice instance (NSSI), transport NSSI and access NSSI slices have delay budgets of 6 ms each. For some reason, "X", the transport sub-network 330 slice is experiencing latency of 8 ms. But, the access sub-network 320, with its available resources might be able to deliver service with 2 ms latency, thereby keeping overall E2E network slice latency within limits.

Embodiments of this disclosure can jointly address/enforce the SLA requirements of a network slice by exploiting near real-time states of access sub-network 320, transport sub-network 330, and core sub-network 340. In other words, access sub-network 320 can be tuned in real-time or near real-time to meet shortcomings of the transport sub-network 330 and core sub-network 340 slices.

Solutions to provision and manage access sub-network 320 slices can separate management of access sub-network 320, transport sub-network 330, and core sub-network 340. Factors for consideration to realize dynamically adaptive 5G access sub-network slices include: (1) performance (SLA achieved) of access sub-network 320 slices for a UE at a given time; and (2) performance (SLA achieved) of corresponding transport sub-network 330 and core sub-network 340 slices, corresponding to the access sub-network 320 slice for the UE at the given time.

Some embodiments can employ controller 322, e.g., a RAN intelligent controller (RIC) to manage network slices at the access sub-network 320. Controller 322 can have a holistic view of access sub-network 320 in a geographical location spanning across multiple radio access technologies. Controller 322 can assign resources of example resources 324A, 324B, 324C, 324D, 324E, 324F to network slices. Controller 322 can supervise, modify and report data regarding access sub-network 320 slices. Controller 322 can furthermore program specific probes in connection with active testing to measure the performance of access sub-network 320 and E2E network slices.

In some implementations according to FIG. 3, each sub-network controller 322, 332, 342, respectively, can manage its own domain (access sub-network 320, transport sub-network 330, or core sub-network 340, respectively) and controllers 322, 332, and 342 can report their counters to E2E slice controller 312. E2E slice controller 312 and network controller 310 can comprise, e.g., a device in a network automation platform layer, e.g., an open network automation platform (ONAP).

Network controller 310 can communicate, e.g., via an A1 interface, with controller 322 regarding deviations observed in SLAs for network slices. To meet the SLA requirements of an E2E network slice, controller 322 can adapt performance of the access sub-network 320 to coordinate with core and transport sub-networks 330, 340 to deliver the network slice's SLA, for a specific user at specific time. Controller 322, when configured for example as disclosed in connection with FIG. 3, can have near real-time capabilities of adapting access sub-network 320 slice resources. Controller 322 can fine-tune access sub-network 320 slices to satisfy end-user SLAs. Such an approach can satisfy SLAs, in particular for latency-critical network slices wherein each sub-network should adapt to its best capabilities to fulfill deficits experienced by other sub-networks.

Tuning access sub-network 320 slices according to constraints imposed by other sub-networks can be advantageous for example when transport sub-network 330 is congested and there are limited possible actions to mitigate transport sub-network 330 congestion. In such circumstances, transport controller 332 can report to E2E slice controller 312. E2E slice controller 312 can decide whether to compensate in the access sub-network 320 or the core sub-network 340, based on reported measurements. E2E slice controller 312 can notify controller 322 or controller 342 of any required compensations.

In scenarios wherein controller 322 is unable to satisfy the SLAs for a network slice, controller 322 can report to the E2E slice controller 312. E2E slice controller 312 can determine further actions as appropriate. Hence, embodiments of FIG. 3 can provide a closed loop auto-slicing framework that facilies management of 5G access sub-network 320 slices in a flexible manner based on network demands.

Figure 4:
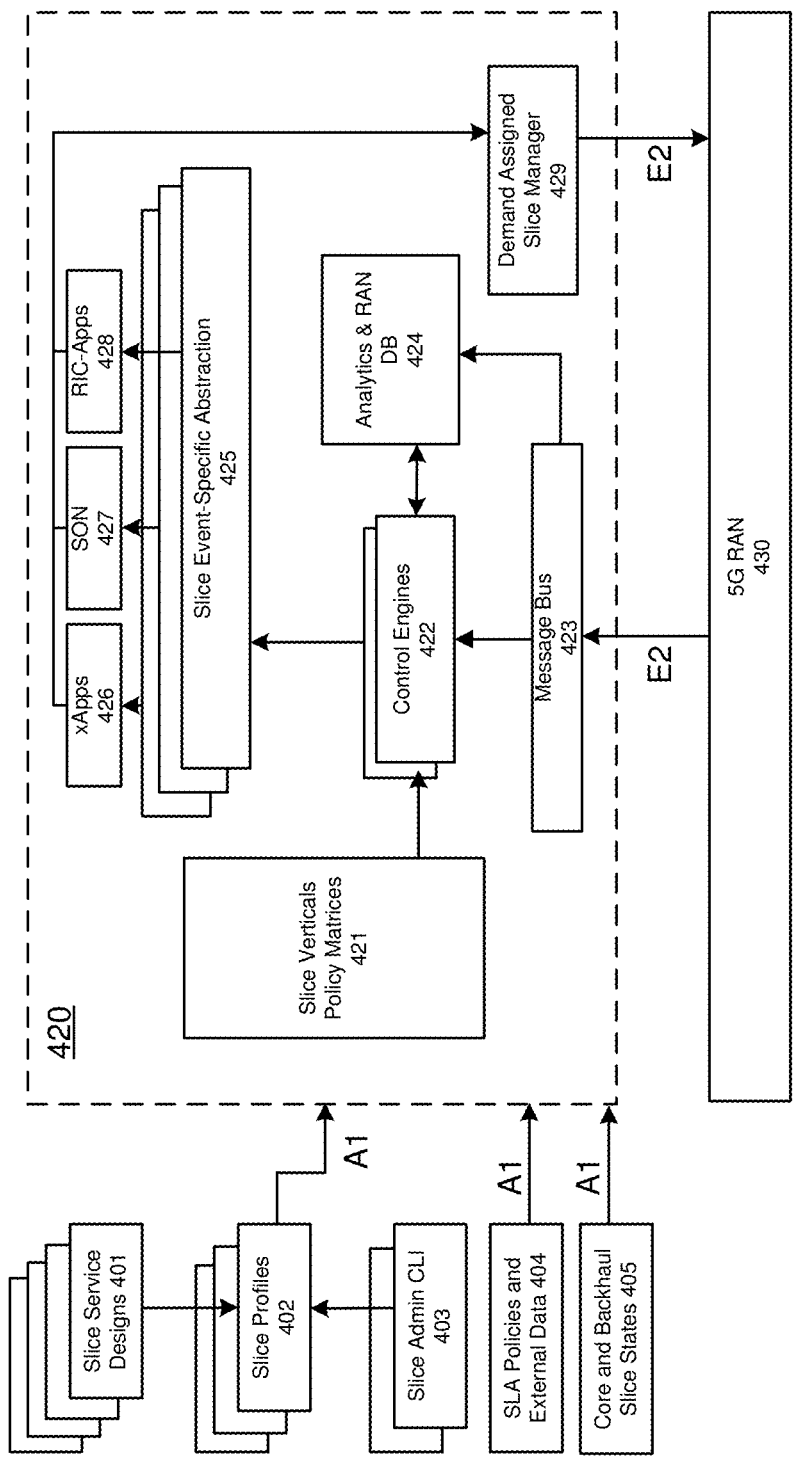
FIG. 4 is a block diagram illustrating an example architecture for network slice management of an access sub-network, in accordance with various aspects and embodiments of the subject disclosure.

FIG. 4 is a block diagram illustrating an example architecture for network slice management of an access sub-network, in accordance with various aspects and embodiments of the subject disclosure. Repetitive description of like elements employed in other embodiments described herein is omitted for sake of brevity. In some embodiments, an architecture such as illustrated in FIG. 4 can be used to implement an access sub-network controller, such as controller 322 in FIG. 3.

FIG. 4 includes a controller 420, a 5G RAN 430, and inputs to the controller 420. The inputs include slice profiles 402, SLA policies and external data 404, and core and backhaul slice states 405. Slice service designs 401 and slice admin CLI 403 can be used to create slice profiles 402. The 5G RAN 430 can include, e.g., resources of an access sub-network managed by controller 420. Controller 420 provides an example embodiment of controller 322 in FIG. 3, and controller 420 can manage resources of 5G RAN 430 similar to controller 322 managing resources 324A, 324B, 324C, 324D, 324E, 324F. Controller 420 can also comprise a 5G slice aware controller, such as a RIC, having any of the various tools and features presently included in 5G specifications and tools and features as may be later developed and incorporated into the 5G specifications. The controller 420 includes slice verticals policy matrices 421, control engines 422, message bus 423, analytics and RAN-DB 424, slice-event specific abstraction 425, xApps 426, SON 427, RIC-Apps 428, and demand assigned slice manager 429.

In FIG. 4, slice profiles 402, SLA policies and external data 404, and core and backhaul slice states 405 can be provided to controller 420 via an A1 interface. The 5G RAN 530 can couple with, e.g., message bus 423 via an E2 interface, and demand assigned slice manager 429 can couple with 5G RAN 530 via the E2 interface.

In FIG. 4, slice service designs 401 can include a visual modelling and design tool that creates internal metadata that describes the slice profiles 402, both at design-time and at runtime. Slice Admin CLI 403 can include a command line interface tool to design slice profiles 402. Slice profiles 402 can be described in any modeling language or JSON. Slice profiles 402 can be compiled into a set of time sensitive slice verticals policy matrices 421 at ONAP or at a network management platform (NMP). The south-bound interface A1 of ONAP can feed slice profiles 402 to RAN controller 420, which can utilize the slice verticals policy matrices 421 as one of the inputs to configure network slices in near real-time.

SLA policies and external data 404 can comprise (1) SLAs for a UE or group of UEs, and (2) external data such as, for example, UE location, UE route, etc. Core and backhaul slice states 405 can be fed via the A1 interface to controller 420, e.g., from ONAP, and core and backhaul slice states 405 can be used to enforce SLAs. ONAP can include the E2E slice controller 312 illustrated in FIG. 3, and can be responsible for E2E slice management and orchestration. This is a valid assumption because ONAP provides a comprehensive platform for real-time, policy-driven orchestration and automation of physical and virtual network functions.

Furthermore, in FIG. 4, control engines 422 can be responsible for invoking an xApp of xApps 426. xApps 426 can have a level of control over 5G RAN 530 functionalities based on observations from the E1 and A1 interfaces. The analytics and RAN DB 424 can comprise RAN and UE state information, along with core & backhaul slice states. The analytics and RAN DB 422 can provide ML based analytics to control engines 424, taking into consideration external data and state information available from other layers. These analytics can be fed to control engines 422 for further actions. E2 messages from 5G RAN 430 and messages between various controller 420 components can be handled by the message bus 423.

Slice event specific abstraction 425 can include an abstraction layer that describes slice specific information, taking into consideration 5G RAN 430 events in near real-time. Slice event specific abstraction 425 can facilitate inferences by xApps 426 and RIC-Apps 428 with respect to network slice(s). The xApps 426, SON 427, and RIC-Apps 428 can comprise algorithms responsible for fine tuning network slice profiles, associating physical resources to logical network slices, and monitoring/delivering UEs SLAs. Demand assigned slice manager 429 can provision the xApp 426 inferences thus resulting in closed-loop auto-slicing.

Control engines 422 can take slice verticals and policy matrices 421 and information from analytics and RAN-DB 424, in order to configure slice-event abstraction 425. Different layers of slice-event abstraction 425 can be created and accessed by xApps 426, SON 427, RIC-Apps 428. xApps 426 can utilize the time sensitive matrices in slice verticals and policy matrices 421 to enforce slice profiles 402 for designated time intervals. xApps 426, SON 427, RIC-Apps 428 can also configure or otherwise interact with the 5G RAN 530 via the demand assigned slice manager 429.

In another aspect, the architecture illustrated in FIG. 4 provides mechanisms for xApps 426 to execute dynamic slicing of the 5G RAN 430 via the E2 interface, based on slice profiles 402 from the A1 interface. To perform dynamic slicing, xApps 426 or controller 420 can project, to 5G RAN 530, the slicing profiles 402 provisioned under various anchor points available at controller 420.

Figures 5, 6:
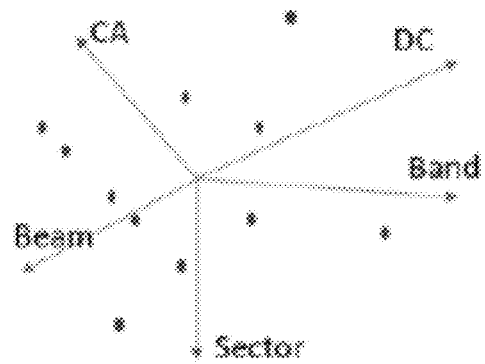
FIG. 5 is an example multi-dimensional graph mapping probabilities of various network resources meeting service level agreements for various network slices, in accordance with various aspects and embodiments of the subject disclosure.
FIG. 6 is an example table including probabilities of various network resources meeting service level agreements for various network slices, in accordance with various aspects and embodiments of the subject disclosure.

FIG. 5 is an example multi-dimensional graph mapping probabilities of various network resources meeting service level agreements for various network slices, in accordance with various aspects and embodiments of the subject disclosure. FIG. 5 illustrates, as points on the graph, a multitude of options/anchor points available at a controller for slice provisioning. The controller, e.g., controller 420, can perform a multi-dimensional operation involving its spectrum, topology and slicing profiles/policies.

FIG. 6 is an example table including probabilities of various network resources meeting service level agreements for various network slices, in accordance with various aspects and embodiments of the subject disclosure. A controller 420, based on its near real-time network view, can employ techniques such as Bayesian inference to calculate probabilities as to how a S-NSSAI can be better served. The calculation can be performed at each time step and can account for previous information. The granularity of the illustrated table can also depend upon the UE-device type, for example, cars, IoT devices, etc. S-NSSAI in FIG. 6 refers to single network slice selection assistance information, and identifies an E2E network slice.

Figure 7:
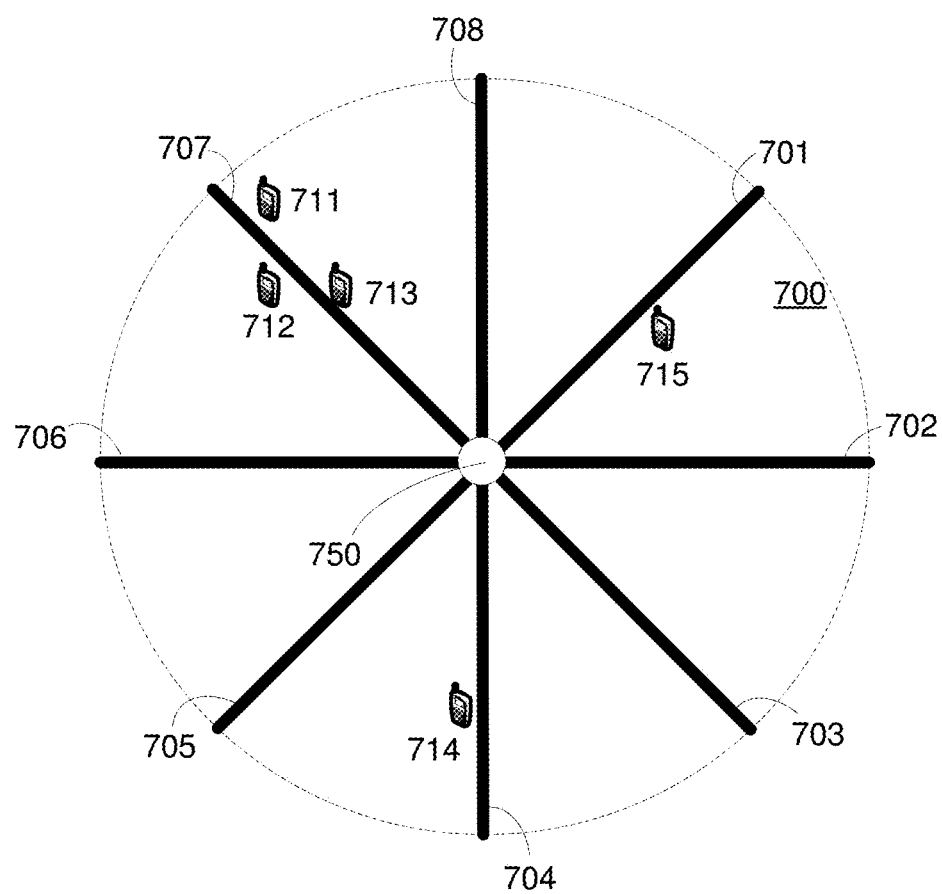
FIG. 7 illustrates an example beam pattern produced by an antenna array and a distribution of UEs serviced by the antenna array, in accordance with various aspects and implementations of the subject disclosure.

FIG. 7 illustrates an example beam pattern produced by an antenna array and a distribution of UEs serviced by the antenna array, in accordance with various aspects and implementations of the subject disclosure. FIG. 7 provides a top view of the antenna array 750, example UEs 711, 712, 713, 714, and 715, and an example service area 700. FIG. 7 furthermore illustrates multiple beams 701, 702, 703, 704, 705, 706, 707, and 708 indicated by bold black lines extending radially from the antenna array 750. Collectively, the beams 701, 702, 703, 704, 705, 706, 707, and 708 form a beam pattern.

FIG. 7 illustrates an example aspect of this disclosure in which network slice policies can take advantage of trained models, for example, to predict network slice-based beam settings. Settings for beams 701, 702, 703, 704, 705, 706, 707, and 708 can be influenced by network slice requirements, on a time-interval by time-interval basis. For example, to decide if a particular beam pattern at a defined carrier frequency will be wide-beam or narrow-beam, beam settings can be mapped onto network slice requirements for network slices served by a beam. Hence, with prediction of an access subnetwork slice's usage/latency requirements, beam patterns can be designed and scheduled for each interval.

FIG. 7 furthermore demonstrates that, in addition to selection of resources to be used in various network slices, in some embodiments, an access sub-network controller, e.g., controller 322 in FIG. 3, can also select settings and tunable parameters for network resources. One example network resource is an antenna array 750, which can generate different beam patterns. Beam pattern settings can be selected or modified, in real-time or near real-time, by controller 322 to meet network slice and/or SLA requirements.

It will be understood that beams 701, 702, 703, 704, 705, 706, 707, and 708 generally comprise zones of constructive interference of radio frequency signals generated at antenna array 750. UEs 711, 712, 713, 714, and 715 generally experience good signal reception when UEs 711, 712, 713, 714, and 715 are near any of the beams 701, 702, 703, 704, 705, 706, 707, and 708. Conversely, zones of destructive interference of radio frequency signals generated at antenna array 201 are present in the white space between beams 701, 702, 703, 704, 705, 706, 707, and 708. UEs 711, 712, 713, 714, and 715 will generally experience poor signal reception when in the troughs, or zones of destructive interference.

The antenna array 750 can be adjusted, e.g., by settings received from a controller 322, to provide any desired beam pattern. To provide strong signals for UEs 711, 712, 713, 714, and 715, a beam pattern that places beams 701, 702, 703, 704, 705, 706, 707, and 708 near UEs 711, 712, 713, 714, and 715 is desired. FIG. 7 shows one example beam pattern that places beams from the beam pattern comprising beams 701, 702, 703, 704, 705, 706, 707, and 708 near UEs 711, 712, 713, 714, and 715. In some cases, tradeoffs may be necessary to provide strong signal to some of UEs 711, 712, 713, 714, and 715. Such tradeoffs can optionally be based in part on network slice and SLA requirements for one or more of UEs 711, 712, 713, 714, and 715, using the techniques provided herein.

Figure 8:
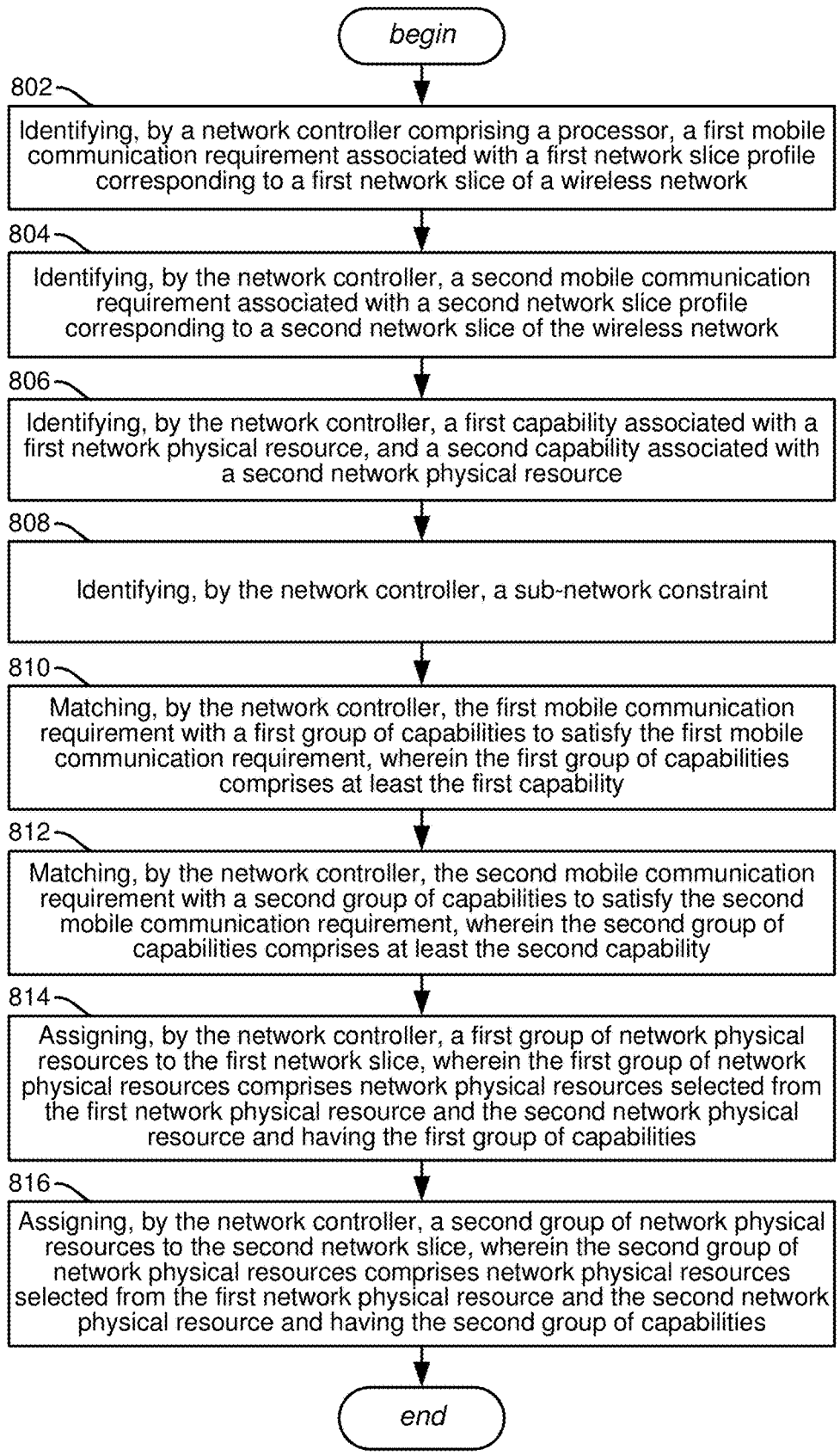
FIG. 8 is a flow diagram representing example operations of a network controller, in accordance with various aspects and implementations of the subject disclosure.

One or more aspects, such as implemented in a machine-readable storage medium, comprising executable instructions that, when executed by a processor, facilitate performance of operations, are represented in FIG. 8. FIG. 8 is a flow diagram representing example operations of a network controller, in accordance with various aspects and implementations of the subject disclosure. While the operations are illustrated in an example sequence, the operations can be eliminated, combined, or re-ordered in some embodiments.

Example operations comprise operation 802, which represents identifying, by a network controller comprising a processor, a first mobile communication requirement associated with a first network slice profile corresponding to a first network slice of a wireless network. For example, with reference to FIG. 3 and FIG. 4, an access sub-network controller 322 or 420 can identify a first mobile communication requirement 304 associated with a first network slice profile of slice profiles 402. The first network slice profile of slice profiles 402 can correspond to a first network slice of a wireless network, e.g., network slice 211 of wireless communication system 100, illustrated in FIG. 2. The first mobile communication requirement can furthermore be associated with a UE, and methods according to FIG. 8 can be performed in response to receiving, at wireless communication system 100, a mobile communication, e.g., communication 302, from the UE.

Operation 804 is similar to operation 802, however, operation 804 is performed for communications via a second network slice, for the purpose of illustration. Operation 804 represents identifying, by the network controller, a second mobile communication requirement associated with a second network slice profile corresponding to a second network slice of the wireless network. For example, with reference to FIG. 3 and FIG. 4, an access sub-network controller 322 or 420 can identify a second mobile communication requirement, similar to mobile communication requirement 304, associated with a second network slice profile of slice profiles 402. The second network slice profile of slice profiles 402 can correspond to a second network slice of a wireless network, e.g., network slice 212 of wireless communication system 100, illustrated in FIG. 2.

Example operations comprise operation 806, which represents identifying, by the network controller, a first capability associated with a first network physical resource, and a second capability associated with a second network physical resource. For example, with reference to FIG. 3 and FIG. 4, an access sub-network controller 322 or 420 can identify capabilities of resources 324A, 324B, 324C, 324D, 324E, 324F, including, e.g., a first capability associated with a first network physical resource 324A, and a second capability associated with a second network physical resource 324B. Capabilities of resources 324A, 324B, 324C, 324D, 324E, 324F can optionally be based on current loads or other state information at resources 324A, 324B, 324C, 324D, 324E, 324F.

In some embodiments, resources 324A, 324B, 324C, 324D, 324E, 324F can comprise access sub-network 320 resources in a network comprising access sub-network 320 resources, transport sub-network 330 resources, and core sub-network 340 resources. The techniques disclosed herein can optionally be extrapolated for use in assigning transport sub-network 330 resources and core sub-network 340 resources to particular network slices. Furthermore, access sub-network 320 resources can optionally include, e.g., resources of multiple wireless access environments, e.g., first and second wireless access environments, in a network comprising multiple wireless access environments.

In some embodiments, operation 806 can include identifying multiple capabilities of a network resource. For example, a first capability associated with a network physical resource can comprise a first beam pattern of an antenna array, and a second capability associated with the network physical resource can comprise a second beam pattern of the antenna array, and so on. Similarly, other network resources can optionally provide multiple capabilities.

Example operations comprise operation 808, which represents identifying, by the network controller, a sub-network constraint. For example, with reference to FIG. 3 and FIG. 4, an access sub-network controller 322 or 420 can identify a sub-network constraint associated with the transport sub-network 330, the core sub-network 340, or resources therein. An example constraint can include, e.g., an amount of expected delay to process or deliver communication 302 to its destination, using a current network slice configuration for communication 302. Constraints can be identified for any network slices, e.g., the first and second network slice. Constraints can optionally be provided to controller 322 or 420 via E2E slice controller 312.

Example operations comprise operation 810, which represents matching, by the network controller, the first mobile communication requirement with a first group of capabilities to satisfy the first mobile communication requirement, wherein the first group of capabilities comprises at least the first capability. For example, with reference to FIG. 3 and FIG. 4, an access sub-network controller 322 or 420 can match the first mobile communication requirement 304, associated with the first network slice, with a first group of capabilities, from the capabilities identified at block 806, to satisfy the first mobile communication requirement 304. The first group of capabilities can comprise, e.g., the first capability identified at block 806. In some embodiments, operation 810 can comprise, e.g., determining a group of capabilities to satisfy the first mobile communication requirement.

Operation 812 is similar to operation 810, however, operation 812 is performed for communications via the second network slice. Operation 812 represents matching, by the network controller, e.g., access sub-network controller 322 or 420, the second mobile communication requirement identified at block 804 with a second group of capabilities, from the capabilities identified at block 806, to satisfy the second mobile communication requirement. The second group of capabilities can comprise, e.g., the second capability identified at block 806.

Operations 810 and 812 can be performed in real-time or near real-time. Real-time or near real-time matching operations for network slice configuration allows network slice resources to dynamically shift in response to real-time traffic loads and other conditions, including but not limited to sub-network constraints identified at block 808. In other words, matching mobile communication requirements with groups of access sub-network capabilities to satisfy the mobile communication requirements can comprise adjusting the access sub-network mobile communication requirements, according to constraints imposed by the other sub-networks.

Example operations comprise operation 814, which represents assigning, by the network controller, a first group of network physical resources to the first network slice, wherein the first group of network physical resources comprises network physical resources selected from the first network physical resource and the second network physical resource and having the first group of capabilities. For example, with reference to FIG. 3 and FIG. 4, access sub-network controller 322 or 420 can assign a first group of network physical resources, selected from among access sub-network resources 324A, 324B, 324C, 324D, 324E, 324F, wherein the selected resources provide the capabilities matched to the first mobile communication requirement at operation 810.

Operation 816 is similar to operation 814, however, operation 816 is performed for communications via the second network slice. Operation 816 represents assigning, by the network controller, a second group of network physical resources to the second network slice, wherein the second group of network physical resources comprises network physical resources selected from the first network physical resource and the second network physical resource and having the second group of capabilities. Operation 816 can be performed in a similar manner as operation 814.

Having assigned resources to the first and second network slices, the network slices can be used for network communications, namely, sending communications from their respective sources to their respective destinations, via the appropriate network slice. Of course, more or fewer network slices can be configured according to the techniques disclosed herein. Furthermore, methods according to FIG. 8 can be repeated as needed to re-configure network slices, e.g., on a real-time or near real-time basis.

Figure 9:
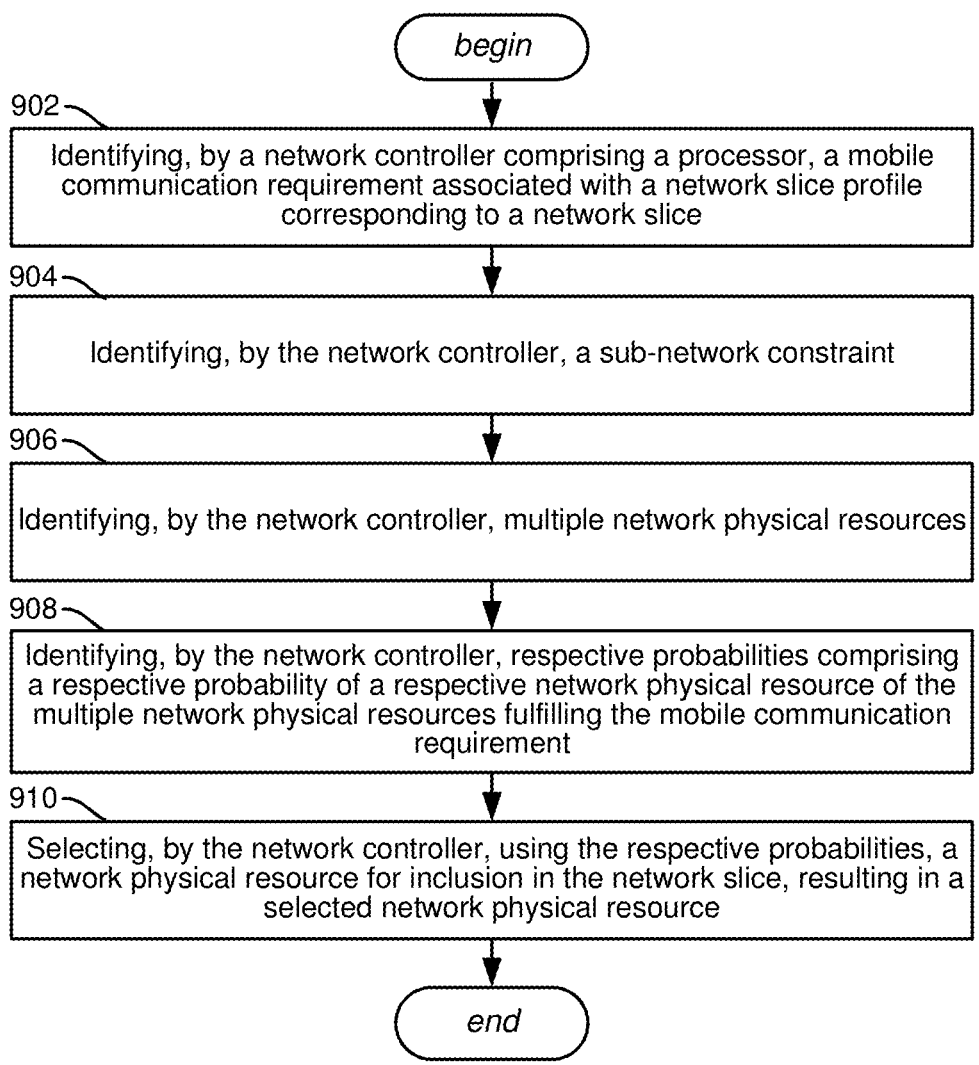
FIG. 9 is a flow diagram representing further example operations of a network controller, in accordance with various aspects and implementations of the subject disclosure.

One or more aspects, such as implemented in a machine-readable storage medium, comprising executable instructions that, when executed by a processor, facilitate performance of operations, are represented in FIG. 9. FIG. 9 is a flow diagram representing example operations of a network controller, in accordance with various aspects and implementations of the subject disclosure. While the operations are illustrated in an example sequence, the operations can be eliminated, combined, or re-ordered in some embodiments.

Example operations comprise operation 902, which represents identifying, by a network controller comprising a processor, a mobile communication requirement associated with a network slice profile corresponding to a network slice. For example, with reference to FIG. 3 and FIG. 4, controller 322 or 420 can identify a mobile communication requirement 304 associated with a network slice profile of slice profiles 402. The mobile communication requirement 304 can be associated with a UE, the method of FIG. 9 can be performed in response to receiving a mobile communication 302 from the UE.

Example operations comprise operation 904, which represents identifying, by the network controller, a sub-network constraint. For example, with reference to FIG. 3 and FIG. 4, controller 322 or 420 can identify constraints associated with the transport sub-network 330 and/or the core sub-network 340. In an embodiment, E2E slice controller 312 can optionally identify constraints associated with the transport sub-network 330 and/or the core sub-network 340, and can provide constraint information to controller 322 or 420. Constraints can comprise, e.g., any constraints affecting abilities of sub-networks to meet mobile communication requirements, e.g., time, reliability, security or other constraints.

Example operations comprise operation 906, which represents identifying, by the network controller, multiple network physical resources. For example, with reference to FIG. 3 and FIG. 4, controller 322 or 420 can identify access sub-network 320 resources 324A, 324B, 324C, 324D, 324E, 324F in a network 100 comprising access sub-network 320 resources, transport sub-network 330 resources, and core sub-network 340 resources. Some example access sub-network 320 resources are illustrated in the column headings of FIG. 6. Furthermore, a network physical resource of the multiple network physical resources can comprise, e.g., an antenna array with a defined beam pattern. Further defined beam patterns can optionally be treated as further access sub-network 320 resources.

Example operations comprise operation 908, which represents identifying, by the network controller, respective probabilities comprising a respective probability of a respective network physical resource of the multiple network physical resources fulfilling the mobile communication requirement. For example, with reference to FIG. 3 and FIG. 4, controller 322 or 420 can identify respective probabilities respective network resources 324A, 324B, 324C, 324D, 324E, 324F fulfilling the mobile communication requirement 304. A table such as illustrated in FIG. 6 can include cell values with the respective probabilities. Alternatively, the respective probabilities can be graphed in a multidimensional graph such as illustrated in FIG. 5.

In some embodiments, operation 908 can comprise identifying, by the network controller, for a respective combination of network physical resources, a respective probability of the respective combination of network physical resources fulfilling the mobile communication requirement. The multidimensional graph illustrated in FIG. 5 can for example plot probabilities associated with multiple different combinations of network resources.

In some embodiments, a probability of a network physical resource fulfilling a mobile communication requirement can comprise a probability in view of a sub-network constraint identified at block 904. For example, when the transport sub-network 330 and/or the core sub-network 340 imposes a time delay, controller 322 or 420 can compensate in the access sub-network 320 by adjusting the mobile communication requirement for the access sub-network 320 and/or probabilities of meeting the mobile communication requirement.

Example operations comprise operation 910, which represents selecting, by the network controller, using the respective probabilities, a network physical resource for inclusion in the network slice, resulting in a selected network physical resource. For example, with reference to FIG. 3 and FIG. 4, controller 322 or 420 can use the respective probabilities identified in operation 908 to select a network physical resource for inclusion in the network slice.

The selected network physical resource can comprise, e.g., a resource or combination or resources with an adequately high probability of meeting the mobile communication requirement 304. For example, when a mobile communication requirement comprises a mobile communication time requirement, the selected network physical resource can have a higher probability of meeting the mobile communication time requirement than at least one other network physical resource of the multiple network physical resources.

Figure 10:
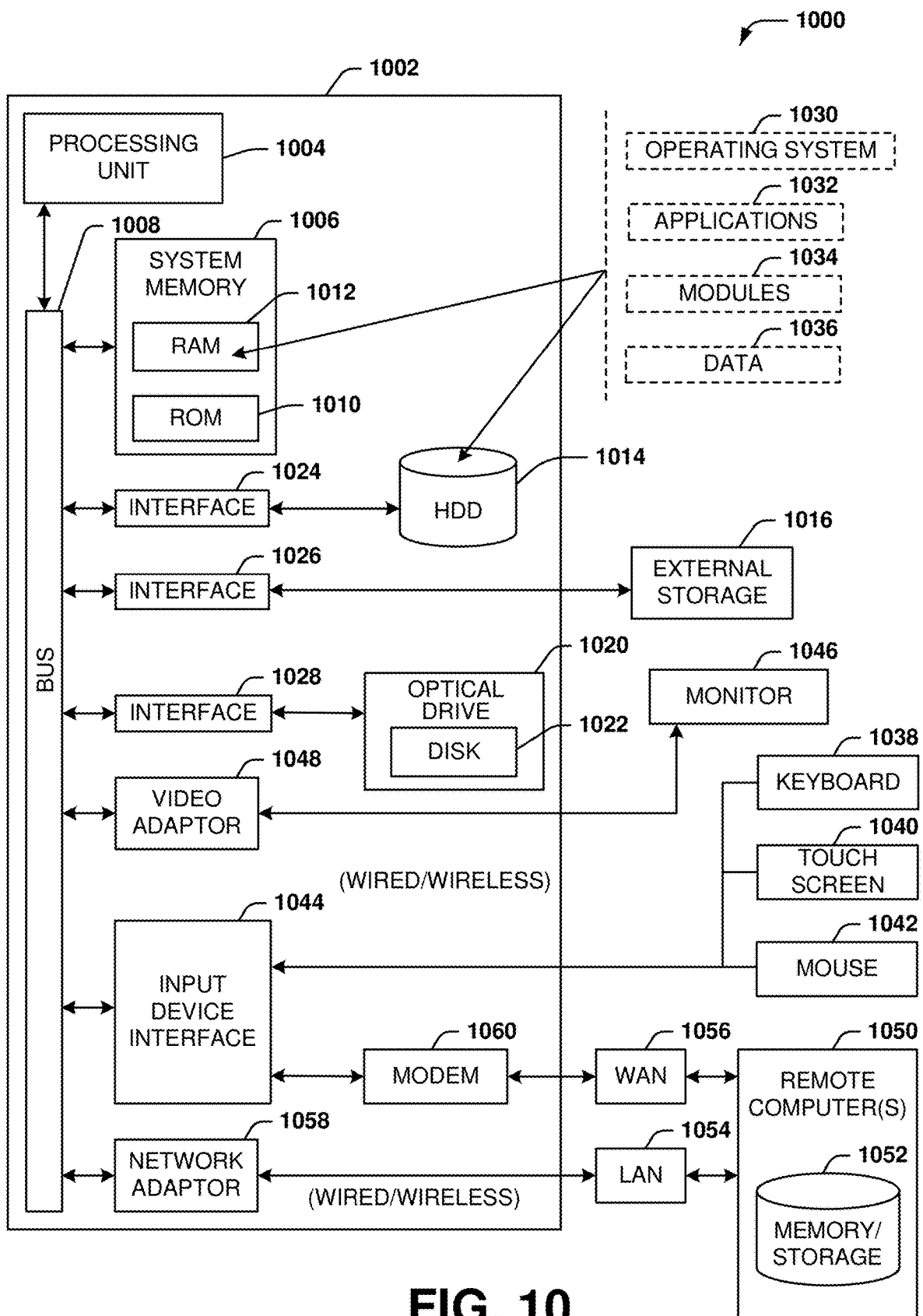
FIG. 10 illustrates a suitable computing environment in which the various aspects of this disclosure can be implemented, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by a network controller comprising a processor, a first mobile communication requirement associated with a first network slice profile corresponding to a first network slice enabled via a network comprising access sub-network resources, transport sub-network resources, and core sub-network resources;
   identifying, by the network controller, a first capability associated with a first network physical resource, and a second capability associated with a second network physical resource,
   wherein the first and second network physical resources comprise the access sub-network resources;
   identifying, by the network controller, a constraint associated with at least one of the transport sub-network resources and the core sub-network resources;
   matching, by the network controller, the first mobile communication requirement with a first group of capabilities to satisfy the first mobile communication requirement, wherein the first group of capabilities comprises at least the first capability,
   wherein the matching comprises adjusting an access sub-network requirement to account for the first mobile communication requirement and the constraint; and
   assigning, by the network controller, a first group of network physical resources to the first network slice, wherein the first group of network physical resources comprises network physical resources selected from the first network physical resource and the second network physical resource and having the first group of capabilities.

2. The method of claim 1, further comprising:
   identifying, by the network controller, a second mobile communication requirement associated with a second network slice profile corresponding to a second network slice enabled via the network;
   matching, by the network controller, the second mobile communication requirement with a second group of capabilities to satisfy the second mobile communication requirement, wherein the second group of capabilities comprises at least the second capability; and
   assigning, by the network controller, a second group of network physical resources to the second network slice, wherein the second group of network physical resources comprises network physical resources selected from the first network physical resource and the second network physical resource and having the second group of capabilities.

3. The method of claim 1, wherein the first and second network physical resources comprise the access sub-network resources of a first wireless access environment in the network, and wherein the network comprises multiple wireless access environments.

4. The method of claim 1, wherein the network controller comprises a radio access network intelligent controller or a network automation platform device.

5. The method of claim 1, wherein the first mobile communication requirement is associated with a user equipment, and wherein the method is performed in response to receiving a mobile communication from the user equipment.

6. The method of claim 1, wherein the first capability associated with the first network physical resource comprises a beam pattern of an antenna array.

7. The method of claim 1, wherein the constraint is with respect to an amount of expected delay associated with processing a communication by the transport sub-network resources or the core sub-network resources.

8. The method of claim 1, wherein the mobile communication requirement comprises a mobile communication time requirement.

9. A method, comprising:
   identifying, by a network controller comprising a processor, a mobile communication requirement associated with a network slice profile corresponding to a network slice;
   identifying, by the network controller, multiple network physical resources,
   wherein the multiple network physical resources comprise access sub-network resources in a network comprising access sub-network resources, transport sub-network resources, and core sub-network resources;
   identifying, by the network controller, a constraint associated with at least one of the transport sub-network resources and the core sub-network resources;
   identifying, by the network controller, respective probabilities comprising a respective probability of a respective network physical resource of the multiple network physical resources fulfilling the mobile communication requirement,
   wherein the respective probability of the respective network physical resource fulfilling the mobile communication requirement comprises a probability in view of the constraint; and
   selecting, by the network controller, using the respective probabilities, a network physical resource for inclusion in the network slice, resulting in a selected network physical resource.

10. The method of claim 9, wherein the mobile communication requirement comprises a mobile communication time requirement and wherein the selected network physical resource has a higher probability of meeting the mobile communication time requirement than at least one other network physical resource of the multiple network physical resources.

11. The method of claim 9, wherein the network controller comprises a radio access network intelligent controller or a network automation platform device.

12. The method of claim 9, wherein the mobile communication requirement is associated with a user equipment, and wherein the method is performed in response to receiving a mobile communication from the user equipment.

13. The method of claim 9, wherein the identifying, by the network controller, the respective probabilities comprises identifying, by the network controller, for a respective combination of network physical resources of the multiple network physical resources, a respective probability of the respective combination of network physical resources fulfilling the mobile communication requirement.

14. The method of claim 9, wherein a network physical resource of the multiple network physical resources comprises an antenna array with a defined beam pattern.

15. The method of claim 9, wherein the constraint is with respect to an amount of expected delay associated with processing a communication by the transport sub-network resources or the core sub-network resources.

16. The method of claim 9, wherein the mobile communication requirement comprises a service level agreement commitment associated with the network slice.

17. A network controller, comprising:
   a processor; and
   a memory that stores executable instructions that, when executed by the processor, facilitate performance of operations, the operations comprising:
      identifying a mobile communication requirement associated with a network slice profile corresponding to a network slice;
      identifying a first capability associated with a first network physical resource, and a second capability associated with a second network physical resource, wherein the first and second network physical resources comprise access sub-network resources associated with a network comprising access sub-network resources, transport sub-network resources, and core sub-network resources;
      identifying a constraint associated with at least one of the transport sub-network resources and the core sub-network resources;
      determining a group of capabilities to satisfy the mobile communication requirement, wherein the group of capabilities comprises at least one of the first capability or the second capability,
         wherein determining the group of capabilities to satisfy the mobile communication requirement comprises accounting for the mobile communication requirement and the constraint; and
      assigning network physical resources to the network slice, wherein the assigned network physical resources comprise network physical resources of the first network physical resource and the second network physical resource having the group of capabilities.

18. The network controller of claim 17, wherein the first and second network physical resources comprise the access sub-network resources of a first wireless access environment of multiple wireless access environments associated with the network.

19. The network controller of claim 17, wherein the mobile communication requirement is associated with a user equipment, and wherein the network controller performs the assigning of the network physical resources to the network slice in response to receiving a communication from the user equipment.

20. The network controller of claim 17, wherein the constraint is with respect to an amount of expected delay associated with processing a communication by the transport sub-network resources or the core sub-network resources.

* * * * *